Patented Nov. 18, 1952

2,618,532

UNITED STATES PATENT OFFICE 2,618,532

METHOD OF MAKING RED IRON OXIDE

Peter James Atkins and John Buttery Peel, Blackley, Manchester, England, assignors to Imperial Chemical Industries Limited, a corporation of Great Britain No Drawing. Application December 6, 1948, Serial No. 63,858. In Great Britain December 15, 1947

4 Claims. (Cl. 23—200)

This invention relates to the manufacture of colouring matters and more particularly it relates to the manufacture of bright red iron oxide colouring matters.

It is known that brown iron oxide pigments can be made by oxidising with air a hot aqueous alkaline suspension of ferrous carbonate but it has not hitherto been described to manufacture bright red iron oxide pigments by a process of this kind.

We have now found that red iron oxide pigments of exceptional brightness can be made by a process of this kind when the suspension of ferrous carbonate used contains a small proportion of a magnesium compound.

According to our invention therefore we provide a process for the manufacture of iron oxide pigments which comprises treating with air, an aqueous alkaline suspension of ferrous carbonate and magnesium carbonate containing between about 0.1 and about 7.0 parts of magnesium to each 100 parts of iron, at a temperature not lower than 60° C.

By the term "magnesium carbonate" we mean any compound which can be regarded as being formed by the partial or complete replacement of the hydrogen atoms of carbonic acid by magnesium atoms, that is to say there are included for example hydroxycarbonates, bicarbonates and basic carbonates.

The suspension of ferrous and magnesium carbonates may be obtained for example by (1) adding a soluble magnesium salt to a solution of a ferrous salt, for example the chloride or sulphate and then adding an alkali metal carbonate solution, (2) precipitating magnesium carbonate by adding alkali metal carbonate to a solution of magnesium salt, adding the suspension to a ferrous salt solution and then adding an alkali metal carbonate or (3) by simply mixing magnesium carbonate suspension and ferrous carbonate suspension.

As indicated above the proportion of magnesium should be between about 0.1 part per 100 parts of iron and about 7 parts per 100 parts of iron. The best results are obtained when there are used between about 1.7 and about 3.4 parts of magnesium to each 100 parts of iron.

In addition to the magnesium there may also be used up to about 10 parts of zinc and/or up to about 4 parts of aluminium per 100 parts of iron. The zinc is used in the form of the carbonate and the aluminium in the form of the hydroxide. The aluminium hydroxide may if desired be precipitated by adding an alkali metal carbonate to an aluminium salt solution, any aluminium carbonate so formed being hydrolysed to the hydroxide.

The air-blowing step must be carried out at a temperature not lower than 60° C. In practice temperatures between 60° C. and 95° C. are found to be convenient.

The pigments may if desired be struck on an inert white base. Thus for example a small proportion of barium chloride may be added to a ferrous salt solution before precipitating the ferrous carbonate and in this way a colloidal precipitate of barium sulphate which forms a suitable inert white base may be obtained. Varying proportions of white base may be used but in order to maintain the high staining power of the pigment the weight of white base used should preferably not be higher than about 10% of the weight of the pigment.

The pigments made by the process of this invention are much brighter than those obtainable in the absence of magnesium.

The invention is illustrated but not limited by the following examples in which the parts are by weight.

Example 1

34.4 parts of copperas ($FeSO_4.7H_2O$) and 1.2 parts of magnesium sulphate ($MgSO_4.7H_2O$) are dissolved in 72 parts of cold water. A cold solution of soda ash prepared by dissolving 17 parts of sodium carbonate in 50 parts of water is then added until the solution is slightly alkaline. The pH of the suspension is then adjusted to approximately 8.6 by adding alkali or mineral acid. The suspension is then heated to 80° C. and oxidised by blowing air through the suspension for 18-20 hours at 80° C. until the ferrous iron content is less than 1%. The pigment is then filtered off, washed, and dried at 80-100° C.

A soft bright red pigment is obtained.

If in the above process the suspension is air-blown for 20-24 hours at 60° C. instead of for 18-20 hours at 80° C. a bright yellowish-red pigment is obtained and if the suspension is air-blown for 18-20 hours at 95° C. a bright bluish red pigment is obtained. A soft red pigment which is much duller than the pigments described above, is obtained in the absence of magnesium.

Example 2

34.4 parts of copperas and 4.8 parts of magnesium sulphate ($MgSO_4.7H_2O$) are dissolved in 80 parts of cold water. A cold solution prepared by dissolving 18 parts of sodium carbonate in 53 parts of water is then added until the mixture is slightly alkaline. The pH of the suspension is adjusted to approximately 8.6 and the suspension is then heated to 80° C. Air is blown through the suspension for 18–20 hours at 80° C. until the ferrous iron content is less than 1%. The pigment is filtered off, washed and dried at 80–100° C.

A yellowish-red pigment is obtained.

Example 3

A cold solution of 1.2 parts of magnesium sulphate ($MgSO_4.7H_2O$) in 4 parts of water is added to a cold solution of 0.52 part of soda ash in 2 parts of water. The suspension so obtained is then added to a cold solution of 34.4 parts of copperas dissolved in 72 parts of water. A cold solution of 17 parts of soda ash in 50 parts of water is then added until the suspension is slightly alkaline. The pH is then adjusted to approximately 8.6 and the suspension is heated to 80° C. Air is then blown through the suspension for 18–20 hours at 80° C. until the ferrous iron content is less than 1%. The pigment is filtered off, washed, and dried at 80–100° C.

A bright-red pigment is obtained.

Example 4

A cold solution of 17 parts of soda ash in 50 parts of water is added to a cold solution of 34.4 parts of copperas in 72 parts of water, until the solution is slightly alkaline. A cold solution of 0.52 part of soda ash in 2 parts of water is added to a cold solution of 1.2 parts of magnesium sulphate ($MgSO_4.7H_2O$) and the suspension so obtained is then added to that formed from copperas and soda ash solution as described above. The pH of the solution is then adjusted to approximately 8.6. The suspension is heated to 80° C. and oxidised by blowing in air for 18–20 hours at 80° C. until the ferrous iron content is less than 1%. The pigment is filtered off, washed, and dried at 80–100° C.

A bright-red pigment is obtained.

Example 5

1.1 parts of magnesium sulphate ($MgSO_4.7H_2O$) are dissolved in 50 parts of a solution of ferrous chloride containing 300 gms. ferrous chloride per litre of solution. A cold solution of 14 parts of sodium carbonate in 50 parts of water is added until the suspension is slightly alkaline. The pH is then adjusted to approximately 8.6. The suspension is heated to 80° C. and air is blown in at 80° C. for 18–20 hours until the ferrous iron content is less than 1%. The pigment is filtered off, washed and dried at 80–100° C.

A bright-red pigment is obtained.

Example 6

34.4 parts of copperas and 2.4 parts of magnesium sulphate ($MgSO_4.7H_2O$) are dissolved in 72 parts of cold water. A cold solution of 17 parts of soda ash in 50 parts of water is then added until the solution is slightly alkaline. The pH is adjusted to approximately 8.0. The suspension is then heated to 80° C. and air is blown in vigorously for 18–20 hours at 80° C. until the ferrous iron content is less than 1%. The pigment is then filtered off, washed, and dried at 80–100° C.

A bright yellowish-red pigment is obtained.

Example 7

34.4 parts of copperas ($FeSO_4.7H_2O$), 4.8 parts of magnesium sulphate ($MgSO_4.7H_2O$) and 1.4 parts of zinc sulphate ($ZnSO_4.7H_2O$) are dissolved in 72 parts of cold water. A cold solution of soda ash, prepared by dissolving 18 parts of soda ash ($Na_2CO_3$) in 50 parts of water, is added until the solution is slightly alkaline. The pH of the suspension is then adjusted to approximately 8.6 by adding the alkali or mineral acid. The suspension is then heated to 80° C. and oxidised by blowing air through for 18–20 hours until the ferrous content is less than 1%. The pigment is then filtered off, washed, and dried at 80–100° C.

A medium red pigment is obtained.

Example 8

34.4 parts of copperas ($FeSO_4.7H_2O$), 1.2 parts of magnesium sulphate ($MgSO_4.7H_2O$) and 2.8 parts of zinc sulphate ($ZnSO.7H_2O$) are dissolved in 72 parts of cold water. A cold solution of soda ash, prepared by dissolving 17 parts of soda ash ($Na_2CO_3$) in 50 parts of water, is added until the solution is slightly alkaline. The pH of the suspension is then adjusted to approximately 8.6 by adding alkali or mineral acid. The suspension is then heated to 80° C. and oxidised by blowing air through for 18–20 hours until the ferrous content is less than 1%. The pigment is then filtered off, washed, and dried at 80–100° C.

A yellowish-red pigment is obtained.

Example 9

34.4 parts of copperas, 1.2 parts of magnesium sulphate and 1.4 parts of zinc sulphate are dissolved in 70 parts of cold water. 0.6 part of barium chloride ($BaCl_2$) are dissolved in 2 parts of cold water and added. A cold solution of soda ash, prepared by dissolving 17 parts of soda ash in 50 parts of cold water, is added until the solution is slightly alkaline. The pH of the suspension is then adjusted to approximately 8.6 by adding alkali or mineral acid. The suspension is then heated to 80° C. and oxidised by blowing air through for 18–20 hours until the ferrous content is less than 1%. The pigment is then filtered off, washed, and dried at 80–100° C.

A bright red pigment is obtained.

Example 10

1.1 parts of magnesium sulphate and 1.28 parts of zinc sulphate are dissolved in 50 parts of a cold solution of ferrous chloride containing 300 gms. per litre of $FeCl_2$. A cold solution of 16 parts of soda ash in 50 parts of water is added until the solution is slightly alkaline. The pH of the suspension is then adjusted to approximately 8.6 by adding alkali or mineral acid. The suspension is then heated to 80° C. and oxidised by blowing air through for 18–20 hours until the ferrous content is less than 1%. The pigment is then filtered off, washed, and dried at 80–100° C.

A yellowish-red pigment is obtained.

Example 11

34.4 parts of copperas, 4.8 parts of magnesium sulphate and 1.2 parts of aluminium sulphate ($Al_2(SO_4)_3.18H_2O$) are dissolved in 72 parts of cold water. A cold solution of soda ash, prepared by dissolving 18 parts of soda ash in 50 parts of water, is then added until the solution is slightly alkaline. The pH of the suspension is then adjusted to approximately 8.6 by adding alkali or mineral acid. The suspension is then heated to 80° C. and oxidised by blowing air through for 18–20 hours until the ferrous content is less than 1%. The pigment is then filtered off, washed, and dried at 80–100° C.

An orange-red pigment is obtained.

*Example 12*

34.4 parts of copperas ($FeSO_4.7H_2O$), 4.8 parts of aluminium sulphate ($Al(SO_4)_3.18H_2O$) and 4.8 parts of magnesium sulphate ($MgSO_4.7H_2O$) are dissolved in 72 parts of cold water. A cold solution of soda ash, prepared by dissolving 20 parts of soda ash in 50 parts of cold water, is then added until the solution is slightly alkaline. The pH of the suspension is then adjusted to approximately 8.6 by adding alkali or mineral acid. The suspension is then heated to 80° C. and oxidised by blowing air through for 18–20 hours until the ferrous content is less than 1%. The pigment is then filtered off, washed, and dried at 80–100° C.

A yellowish-red pigment is obtained.

We claim:

1. Process for the manufacture of red iron oxide pigments which comprises blowing with air, an aqueous alkaline suspension of ferrous carbonate and magnesium carbonate containing between about 0.1 and about 7.0 parts of cationic magnesium to each 100 parts of cationic iron, at a temperature which at all times during the blowing treatment is between 60° C. and 95° C.

2. Process for the manufacture of red iron oxide pigments which comprises blowing with air, an aqueous alkaline suspension of ferrous carbonate and magnesium carbonate containing between about 1.7 and about 3.4 parts of cationic magnesium to 100 parts of cationic iron at a temperature which at all times during the blowing treatment is between 60° C. and 95° C.

3. Process for the manufacture of red iron oxide pigments which comprises forming an aqueous alkaline suspension of ferrous carbonate, magnesium carbonate and zinc carbonate containing between about 0.1 and 7.0 parts of cationic magnesium and up to 10 parts of cationic zinc for each 100 parts of cationic iron, heating the suspension to a temperature between 60 and 95° C. and blowing the heated suspension with air, whereby the red iron oxide pigment is obtained.

4. Process for the manufacture of red iron oxide pigments which comprises forming an aqueous alkaline suspension of ferrous carbonate, magnesium carbonate and an aluminum compound selected from the group consisting of aluminum carbonate and aluminum hydroxide containing between about 0.1 and 7.0 parts of cationic magnesium and up to 4 parts of cationic aluminum for each 100 parts of cationic iron, heating the suspension to a temperature between 60 and 95° C. and blowing the heated suspension with air, whereby the red iron oxide pigment is obtained.

PETER JAMES ATKINS.
JOHN BUTTERY PEEL.

REFERENCES CITED

The following references are of record in the file of this patent:

UNITED STATES PATENTS

| Number | Name | Date |
|---|---|---|
| 564,731 | D'Andria | July 28, 1896 |
| 1,269,442 | Hoffman | June 11, 1918 |
| 1,501,873 | Tyrer | July 15, 1924 |
| 1,840,326 | Ott et al. | Jan. 12, 1932 |
| 1,888,464 | Lofland | Nov. 22, 1932 |
| 2,090,476 | Fireman | Aug. 17, 1937 |
| 2,388,659 | Ryan et al. | Nov. 6, 1945 |

FOREIGN PATENTS

| Number | Country | Date |
|---|---|---|
| 1,882 of 1892 | Great Britain | Dec. 3, 1892 |
| 4,712 of 1900 | Great Britain | Feb. 9, 1901 |
| 239,709 | Great Britain | Sept. 17, 1925 |
| 313,999 | Great Britain | June 21, 1929 |

OTHER REFERENCES

Mellor: "Comprehensive Treatise on Inorganic and Theoretical Chemistry," vol. 13, page 789 (1934); vol. 14, page 365 (1935), Longmans, Green and Co., N. Y. C., New York.